STILL PICTURE RECORDER FOR TELEVISION RECEIVERS

Filed Oct. 29, 1949 4 Sheets-Sheet 1

Inventors
ELLISON S. PURINGTON,
JOHN HAYS HAMMOND, JR.
By [signature]
Attorney

June 1, 1954 E. S. PURINGTON ET AL 2,680,148

STILL PICTURE RECORDER FOR TELEVISION RECEIVERS

Filed Oct. 29, 1949 4 Sheets-Sheet 2

Inventors

ELLISON S. PURINGTON,

By JOHN HAYS HAMMOND, JR.

Attorney

June 1, 1954 E. S. PURINGTON ET AL 2,680,148

STILL PICTURE RECORDER FOR TELEVISION RECEIVERS

Filed Oct. 29, 1949 4 Sheets-Sheet 3

Inventors

ELLISON S. PURINGTON,

By JOHN HAYS HAMMOND, JR.

[signature]

Attorney

Inventors
ELLISON S. PURINGTON,
JOHN HAYS HAMMOND, JR.
By [signature]
Attorney

Patented June 1, 1954 2,680,148

UNITED STATES PATENT OFFICE 2,680,148

STILL PICTURE RECORDER FOR TELEVISION RECEIVERS

Ellison S. Purington and John Hays Hammond, Jr., Gloucester, Mass.; said Purington assignor to said Hammond, Jr.

Application October 29, 1949, Serial No. 124,418

5 Claims. (Cl. 178—6.7)

This invention relates to the recording of pictures produced by television transmission upon a television receiver screen.

The invention provides means in cooperation with a standard television receiver for setting up a camera system and operating the camera shutter in response to depressing a push button, whereby a picture may be properly recorded not later than one second after a decision has been made to make the record. The construction is such that normally the camera is in a folded condition so that there is no interference with the normal viewing of the television screen.

The invention further provides means whereby the recording may be controlled from a remote location, and more specifically from the transmitter studio. In this manner special picture information known to be of permanent interest to the television receiver owner may be flashed, requiring a video transmission time of less than half a second. Such recordable information might include weather maps, recipes, emergency instructions in times of disaster, baseball scores, facsimiles of box tops, finger prints and photographs for police purposes, and the like.

The invention provides further a system of remote control signalling suitable for operating the camera whereby it will not respond improperly to signals normally passing from the transmitter to the receiver.

The invention also consists in certain new and original features of construction and combination of parts hereinafter set forth and claimed.

The nature of the invention will be better understood by referring to the following description, taken in connection with the accompanying drawings forming a part thereof in which Fig. 1 is a schematic diagram illustrating the general arrangement of a receiver embodying the invention;

Like reference characters denote like parts in the several figures of the drawings.

In the following description, parts will be identified by specific names for convenience, but they are intended to be generic in their application to similar parts.

Figure 1:
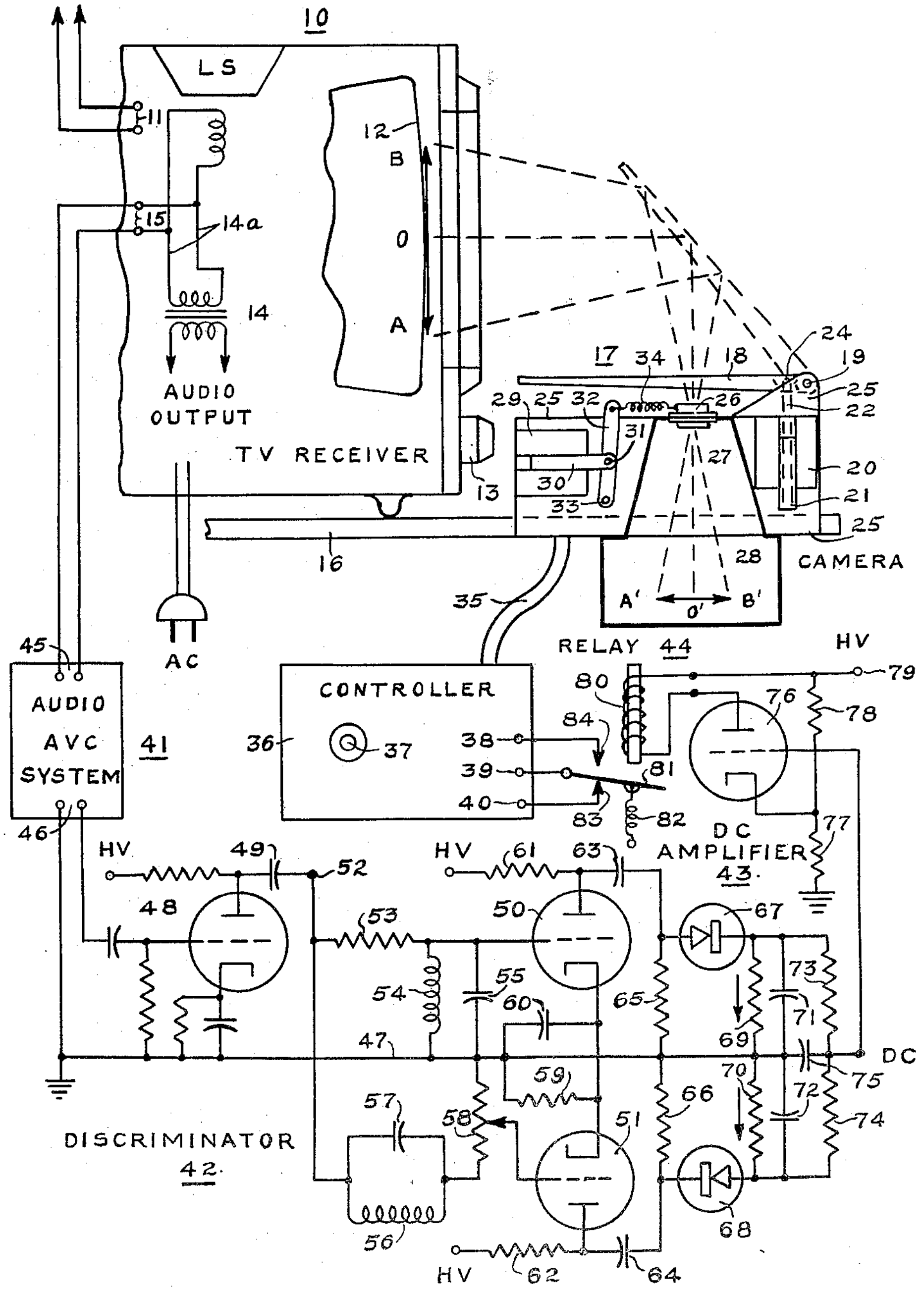

Referring to the drawings and more particularly to Fig. 1, the receiving system includes a television receiver 10, which may be of standard commercial construction. This is provided with terminals 11 connected to a receiving antenna not shown, and produces a television picture designated by the double ended arrow upon the screen of the kinescope 12, when the controls 13 are suitably adjusted and the set powerized. Terminals 15 are connected in parallel with the leads 14*a* from the audio output transformer 14 to the loud speaker LS so that special signals sent through the audio system of the television transmitter and receiver may be used to cause a picture to be taken automatically, in a manner to be described. The television receiver is mounted on the top 16 of a table or cabinet which may house other equipment shown in this figure.

Figure 2:
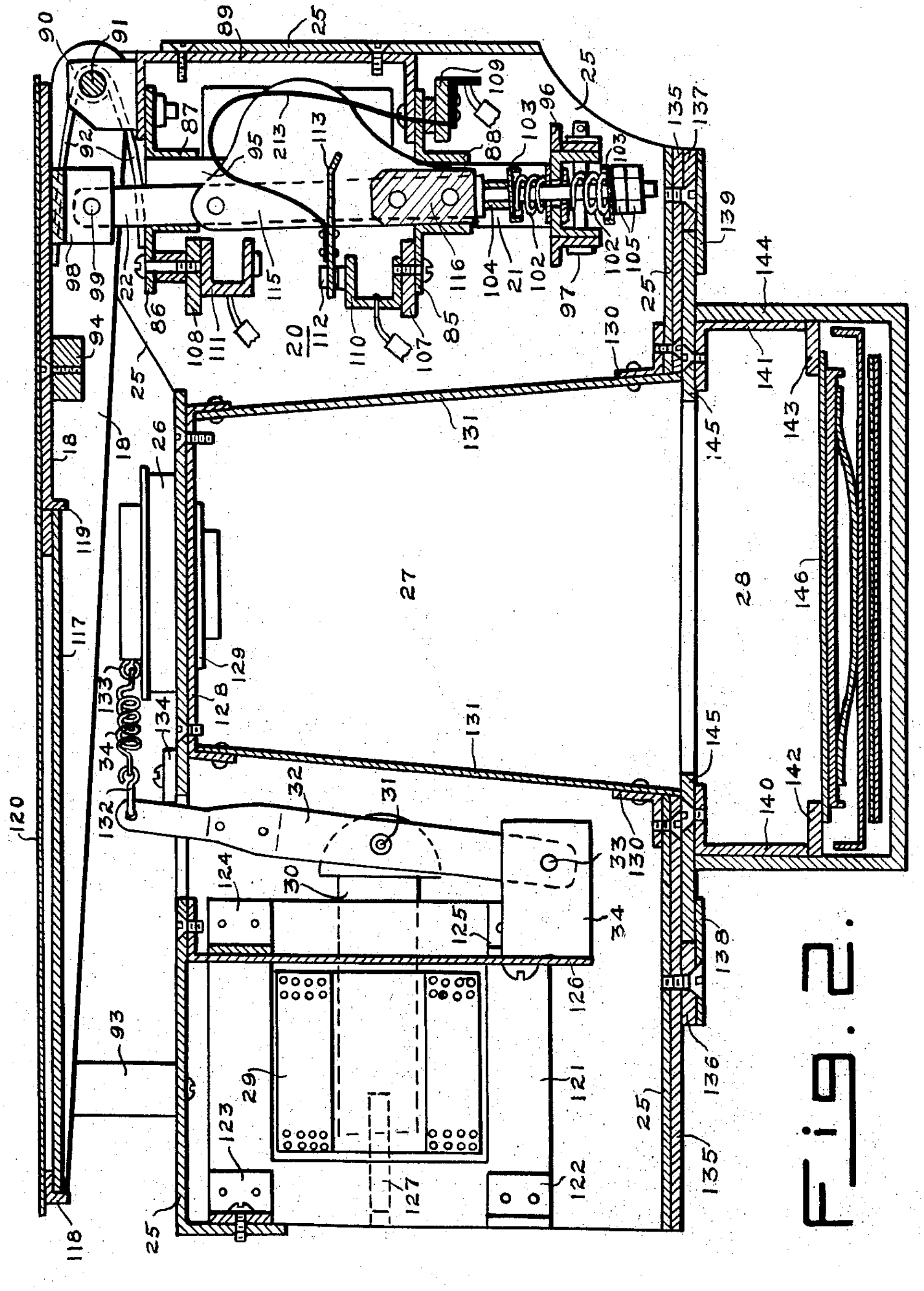
Fig. 2 is a side elevation partly in section of the camera and control unit.
Figures 3, 4:
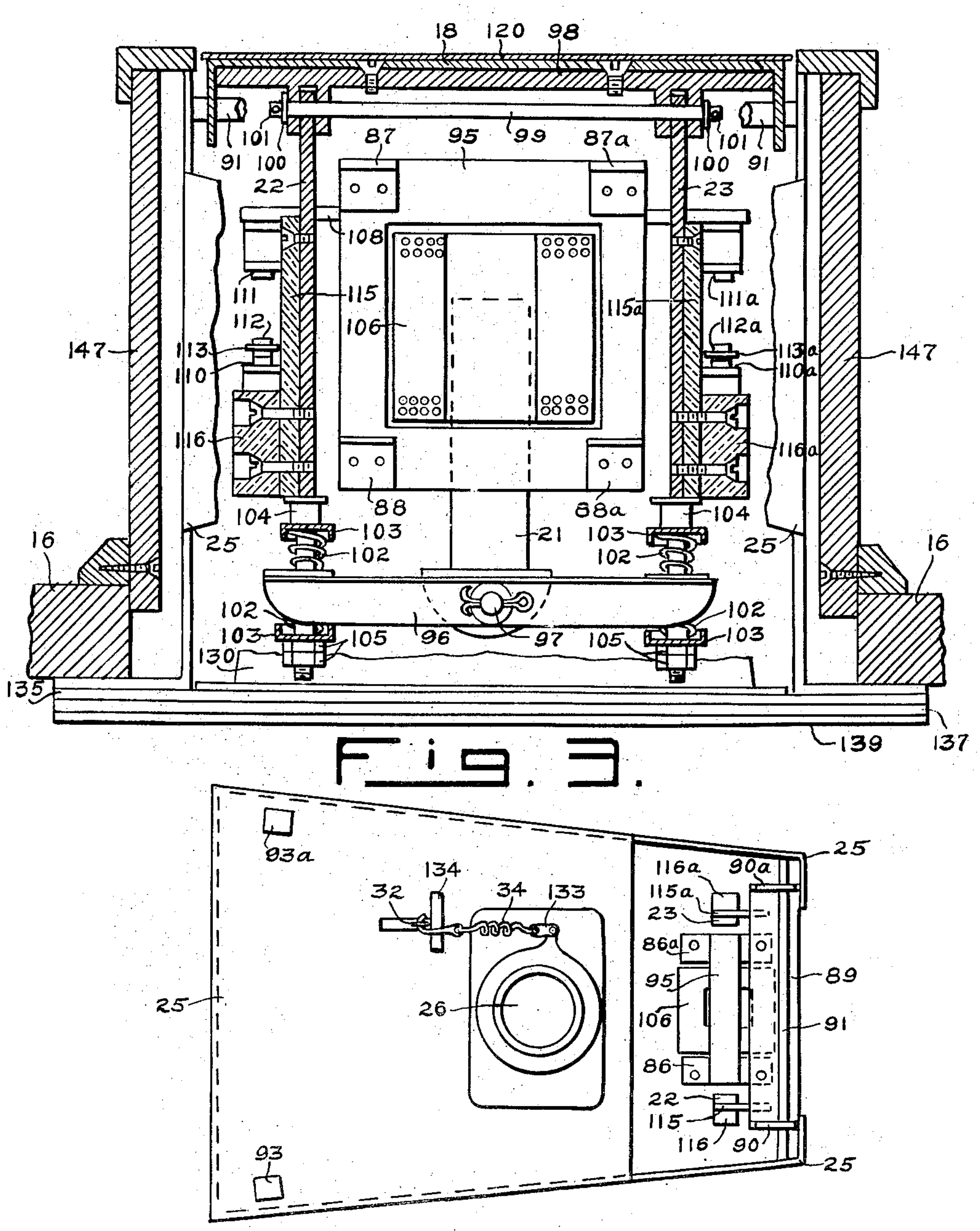
Fig. 3 is an end elevation partly in section looking at the lifter end of the mechanism.
Fig. 4 is a top plan view of the camera and lifting mechanism

The camera 17 for taking and recording a picture shown in more detail in Figs. 2, 3, 4, projects upwardly through a hole in the table top 16, and includes a mirror frame 18 mounted to rotate about a hinge pin 19 in such a manner that it may be elevated from the normal horizontal position to a position at an angle of approximately 45 degrees with the horizontal as indicated by dash lines to intercept the picture rays and reflect them downwardly to the camera lens. The mirror 18 is elevated electrically by means of a solenoid of standard construction including a coil 20 within a solenoid frame not shown, which draws up a plunger 21 when the coil 20 is energized. The lower part of the plunger is connected by riser bars 22, 23 and a hinge 24 to the mirror frame 18. These parts 18 to 24 inclusive constitute the camera lid assembly which as a unit is mounted from the camera chassis 25. For simplicity the mirror on the underside of the mirror frame and various other parts are not shown in detail.

In addition to the mirror, the optical system of the camera includes a lens 26 complete with shutter, lens and iris mounted with its axis vertical as shown so that when the mirror frame 18 is raised to a 45° angle, the central ray from the picture AOB on the television screen which comes to the center of the aperture of the lens will travel horizontally to the right and vertically downward. Below the lens 26 is the dark chamber 27 associated with the upper or optical part of the camera, and a detachable dark chamber 28 associated with the lower or photo-chemical part of the camera. When the mirror frame is raised to 45° and the shutter is opened, the picture AOB produces an image A'O'B' within the chamber 28, and the choice of parts and dimension is such that this occurs in the plane of a recording surface, such as the negative of a standard commercial film not shown. Since the nature of the recording material does not constitute a part of the present invention, the equipment in and associated with the chamber 28 is not shown or described in detail.

For actuating the shutter of lens system 25, a solenoid type actuator is provided with coil 29, plunger 30, the latter being hinged by pin 31 to a lever 32 turning on a hinge pin 33 at the lower end. The upper end of the lever 32 projects up through the camera chassis 25 and is connected by a coupling spring 34 to the operating lever of the shutter, not shown. It will be understood that the shutter is of the single motion type so that one lever associated with the shutter serves to cock and to trip the shutter mechanism. It will be understood that the shutter is adjusted for "instantaneous" exposure of duration such as $\frac{1}{10}$ or $\frac{1}{15}$ second, and that this will start while the plunger 30 of the shutter solenoid is being drawn in. The lens system, upper dark chamber and shutter solenoid are all suitably supported from the camera chassis.

With this arrangement a picture may be taken by energizing winding 20 of the lifter solenoid, causing the mirror to be elevated to 45 degree position, and subsequently energizing winding 29 of the shutter solenoid to operate the shutter mechanism, forming the latent picture A'O'B' on the recording surface in lower dark chamber 28. After these operations, the currents in the solenoids may be dropped to zero, whereupon the mirror frame is restored to normal horizontal position by the force of gravity, and the shutter solenoid plunger is pulled out by the action of the spring 34 in connection with the spring system within the shutter. This restoring action is also sufficient to restore the shutter mechanism itself to normal so that it may be subsequently opened during a later operation of the shutter solenoid. Care must be taken so that there is little frictional drag associated with the lever 32, its hinges or the plunger 30.

The camera 17 is connected by a control line 35 to the controller 36 shown in block diagram, but including a push button 37, a power source, and timing means. These are arranged so that pushing the button operates first the lifter mechanism and then the shutter mechanism. In case several exposures are to be made in rapid succession, the control may be such that the shutter solenoid operates and releases several times while the mirror is in the lifted position. For such multiple operation, the controller mechanism also should serve to change the recording surface where the image A'O'B' is formed on successive exposure surfaces.

The controller 36 is provided with three terminals 38, 39, 40 suitably connected to the push button 37 so that the control operation may also be executed from a remote location or in the instance shown by a suitable audio signal applied from terminals 15 of the television receiver. Thus the controller circuits may be so organized that normally terminal 39 is connected to terminal 40, that the shutter solenoid may be caused to operate say 0.8 second after the external connection between 39 and 40 is broken, and that the lifter solenoid may be caused to be lifted and to be at rest in lifted position 0.5 second after external connection has been made between terminals 39 and 38. Details of a suitable camera and controller mechanism for this purpose are shown in Figs. 2, 3, 4, 5, together with additional features which for clearness have not been incorporated in the general diagram of Fig. 1.

For operating the controller from external connections at terminals 38, 39, 40, in response to a suitable signal at the special audio terminals, a selective audio relay system is used. In the present instance it is assumed that the control will be exercised by a high frequency tone such as 7000 C. P. S. coming from the transmitter after a preparatory tone say of 6500 C. P. S. value. Thus the entire audio tone could be of four seconds duration, that is 6500 for two seconds followed by 7000 for two seconds, with the camera arranged to take the picture being transmitted between 0.8 and 1.2 second after the change from 6500 to 7000 cycles. The circuits for operating the controller may be such as provided by the audio AVC system 41, discriminator 42, D. C. amplifier 43 and relay 44 of Fig. 1. These circuits may be referred to as the "selector" circuit. The purpose of the AVC system is to provide the discriminator with a signal of 7000 C. P. S. of suitable strength over a wide range of voltage which may occur at the terminals 15. The discriminator is for the purpose of operating the D. C. amplifier 43 and relay 44 in response to a control signal very closely in the vicinity of the nominal value of 7000 C. P. S. It further provides that the operation will not take place when the 7000 C. P. S. is present as a harmonic overtone of speech or musical signals, but will take place only when the 7000 cycle tone is clearly that which is intended to operate the camera.

The audio AVC system may be of any well known construction. Thus the output terminals 15 may be operatively connected to terminals 45 of the AVC circuit to drive the control grid of a remote cutoff pentode with resistor plate feed in the output circuit. The output of this pentode may be coupled to the output terminals 46, and also coupled to drive a rectifier, the D. C. output of which is inserted back into the grid circuit of the pentode in such a manner as to increase the grid bias. Preferably the AVC should be of the delayed type whereby there is no rectified output and consequently no reduction of gain unless the input signal exceeds a suitable threshold value. The time constant may be of the order of 0.5 second such that equilibrium is fairly completely established in 2.0 seconds corresponding to the duration of the 6500 cycle preliminary signal. This system should pass all frequencies say from 500 to 8000 C. P. S., so that the discriminator may be energized not only by the 7000 C. P. S. control signal, but also by 3500, 2333, 1750, 1400 C. P. S. etc. which may be the fundamentals of a 7000 C. P. S. tone component which is not desired to operate the system.

One of the output terminals 46 of the AVC system is connected to ground line 47, and the other to a conventional amplifier stage 48, where the signals are amplified and impressed through coupling capacitor 49 and through selective circuits onto the grids of two rectifier driver triodes 50 and 51. For this purpose, the output terminal 52 of capacitor 49 is connected through resistor 53 to the grid of triode 50, which is connected to ground line 47 through inductor 54 paralleled by capacitor 55. The circuit 54, 55 is tuned to 7000 C. P. S., and the connections are such that tube 50 will be driven most strongly when the voltage between terminal 52 and ground line 47 is about 7000 C. P. S. On the other hand, for driving the grid of triode 51, the terminal 52 is connected through inductor 56 paralleled by capacitor 57 to one end of a potentiometer 58, the other end of which is connected to ground and the adjustable tap of which is connected to the grid of triode 51. The circuit 56, 57 is also tuned to 7000 cycles, but the connections are such that tube 51 will be driven most strongly when the voltage between terminal 52 and ground line 47 is not 7000 cycles. Thus for example, with both tubes 50 and 51 driven from the common source, such as the voltage between terminal 52 and ground line 47, the constants of the circuit might be chosen such that tubes 50 and 51 are equally driven both at 6500 and 7600 C. P. S., with tube 50 driven more strongly between these values, and tube 51 driven more strongly outside those values. The two triodes 50, 51 are of like construction; with cathodes joined together and connected to ground line 47 through cathode resistor 59 paralleled by capacitor 60; with the plates connected through equal output resistors 61 and 62 to equal high voltage sources H–V; with the plates also connected through equal capacitors 63, 64 and equal resistors 65 and 66 to ground line 47. However the junction of capacitor 63 and resistor 65 is connected to the anode of a rectifier 67, and the junction of capacitor 64 and resistor 66 is connected to the cathode of a rectifier 68, these rectifiers being of like characteristics. The cathode of rectifier 67 and anode of rectifier 68 are connected to ground line 47 through equal resistors 69, 70 respectively shunted by capacitors 71, 72, and through equal resistors 73 and 74 respectively to a common output terminal marked DC, which is bypassed to ground by capacitor 75. The directions of D. C. components of rectified currents in resistors 69 and 70 are indicated by arrows, and the connections are such that signal on the grid of triode 50 tends to make the output point DC positive, and signal on the grid of triode 51 tends to make it negative. In the absence of signal, the output terminal is at ground potential, and is conductively connected to ground through the resistors 73, 74, 69 and 70. The discriminator terminal DC is directly connected to the grid of a D. C. amplifier or relay tube 76, the cathode of which is connected to ground through variable resistor 77, and also through resistor 78 to a source 79 of high voltage, which source 79 is also connected through winding 80 of relay 44 to the plate of triode 76. The relay 44 has an armature 81 normally held open by a spring 82, with a back contact 83 connected to terminal 40 of the controller 36, a front contact 84 connected to the terminal 38 of the controller, and the armature itself connected to terminal 39. Adjustments of resistor 77 are such that when there is no A. C. voltage across terminals 15 of the receiver, the relay current is insufficient to lift the armature. Thus for example the no signal relay winding current may be 1 ma.; the relay may pull in at 5 ma., and drop out and stay out when the current reduces below 3 ma. Thus the relay upon closing due to sufficient D. C. voltage at terminal DC will cause the camera 17 to function just as though the push button 37 were depressed, and upon opening due to insufficient D. C. voltage will reset the camera just as though the push button 37 were released.

Speech and musical signals rarely have a fundamental of frequency more than 5000 cycles, and the fundamental when high is usually much stronger than the harmonics. Therefore 7000 cycle tones due to music or speech will be accompanied by stronger fundamentals which cause the voltage of terminal DC to go negative in spite of the presence of the 7000 cycle component.

It is clear that the features of the selective system provide for operation of the relay 44 only when the transmitted signal is correct as to frequency within a few percent of the nominal value, and only when the signal frequency is transmitted as a fundamental and not as a harmonic of speech or musical fundamentals. This gives the system sufficient selectivity and freedom from spurious operations on protected commercial radio channels, so that only in extremely rare cases will the system operate when not intended.

Although some of the new and useful features of the invention are shown in Fig. 1, there are other important features of the camera mechanism with special reference to Figs. 2, 3, 4. Specifically it has been found desirable to use a moving system for the mirror which is nearly in dynamic balance, so as to reduce the amount of torque which must be applied to lift the mirror from a horizontal to the operating condition. Although it is possible to counterbalance the mirror system by weights, it has been found practicable to use a spring system for this purpose.

Furthermore it has been found desirable to provide for applying an especially high torque at the start of the mirror throw, and a much lesser torque toward the end of the throw, so that the mirror may rise in the shortest possible time without excessive vibration about the point of equilibrium as the solenoid comes to rest. This may be accomplished by control of the current value in the lifter solenoid coil. This may be done in a number of ways, but in the present instance it has proven satisfactory to provide a double pole double throw switch which is actuated during the rise of the mirror to decrease the voltage on the lifter solenoid after the initial surge of current. It has been found practical and effective to operate this switch from the risers of the mechanism so that the change of current will always occur at a proper point in the lifter operation.

The chassis 25 is a one piece sheet metal stamping formed in inverted U shape, with flat top beneath the mirror, vertical sides, and with the bottom flanged outward in a horizontal plane to form a seat on the under part of the table top as shown most clearly in Fig. 3. The top is of trapezoidal shape, as shown in Fig. 4 with the narrower cross section at the lifter solenoid end. The reason for this shape is evident from Fig. 1, since the mirror must be wider at the most elevated portion where it intercepts the rays from B than at the portion where it intercepts the rays from A on the way to the lens.

The lifter solenoid frame is fitted with mounting angles 85 to 88 with similar angles at the rear, referred to as 85*a* to 88*a* respectively. This solenoid frame is supported from the chassis 25 by a sheet metal stamping 89 to which the solenoid frame is bolted using angles 87, 88 and 87*a*, 88*a*. This stamping 89 has ears 90, 90*a*, turned up at the top and pierced to take the pin 91 of the mirror frame hinge, with a tight fit. The pin 91 also passes through holes in the vertical sides of the mirror frame 18 (Fig. 3), with a loose fit, so that the pin is stationary and the mirror frame turns upon it. A ball bearing could be used at this place if desired, and spacers may be used on the pin between the mirror frame and the pin supporting ears on stamping 89 to prevent the mirror frame sliding on the pin. The length of the pin is such that when the solenoid and mirror frame assembly is slipped into position and bolted to the chassis 25, there will be negligible side play of the pin and everything will be held in proper position. Around the pin between the ears 90 and 90*a* of stamping 89 is placed a helical spring 92 of heavy wire, with one end extended out under the horizontal part of the mirror frame, and the other extended out above the frame of the solenoid. This spring is under tension in such a manner that it tends to lift the mirror frame from horizonal. Adjustments are made such that the counterclockwise torque due to the weight of the frame and accessories, and also due to the weight of the solenoid plunger and accessories is slightly greater than the clockwise torque due to the spring, so that when the frame is released from its elevated 45 degree position, it will have a net counterclockwise torque at all times in its fall, and will come to rest against a stop 93 between the chassis 25 and the edge of the frame 18. In case the equipment is used where the force of gravity is less than that where the equipment is manufactured, additional weights, such as 94 may be attached to the under side of the mirror frame to make the return operation positive.

As seen especially in Fig. 3 the risers 22 and 23 by which the solenoid drives the mirror frame are located between the solenoid frame 95 and the chassis 25, and are driven by plunger 21 using an equalizer arm 96 to which the plunger is attached by a pin 97 with washer and a cotter pin to keep it in place. This connection is sufficiently loose so that the equalizer arm may rotate slightly as may be required to prevent binding. The equalizer arm may be a special casting or fabricated from a channel section and two L sections of suitable rolled stock. The risers 22 and 23 are of rectangular section near the top, and have holes by which they are coupled to the mirror frame 18 by a notched casting 98 fastened by screws to the mirror frame 18, and by a hinge pin 99 suitably held in place by washers and cotter pins 100 and 101. The lower ends of the risers are of circular cross section, threaded at the extreme lowest portion. These lower ends pass through vertical holes in the equalizer bar 96, and are preferably held in position by compression springs 102 between cup washers 103, with spacers 104 between the upper washers and the shoulders of the risers, and with double nuts 105 below the lower washers. These springs are to cushion the system as the plunger 21 of the solenoid becomes pulled into the frame, and also to permit flexible coupling from the risers to the equalizer. The spacers 104 are of suitable length so that the mirror frame will come to the proper 45 degree angle when the plunger is pulled in, with a fine adjustment by the setting of the nuts 105. These are accessible from the narrow end of the chassis for adjustment to secure proper vertical registration of the kinescope picture on the recording surface.

To provide reduction of current in the windings of coil 20 of the lifter solenoid after the initial throw, strips of insulating material such as Bakelite 107, 108 and 109 are mounted as shown from the angles 85, 86, 88, 85*a*, 86*a*, 88*a* from which the parts of a switching mechanism may be mounted, electrically insulated from the frame. Fixed back contacts 110, 110*a*, and front contacts 111, 111*a* are fastened to the strips 107 and 108 respectively, and the anchorages for the movable arms are made on strip 109. The movable contacts 112 and 112*a* are riveted into metal strips 113 and 113*a* normally extending horizontally, with a downward bend at the end, and the metal strips are riveted to a flexible flat spring 213 such as Phosphor bronze suitably shaped and secured to the insulating strip 109. To avoid possible confusion, the fasteners between the electrical conducting members and the Bakelite strips are not shown. Suitable electrical connections are made to the contacts and the solenoid windings from which wires lead to the controller 36 of Fig. 1.

To actuate the switch parts by the solenoid, insulating aprons 115 and 115*a* and driving dogs of insulating material 116 and 116*a* are fastened by screws to the risers 22 and 23 as indicated so arranged that the dogs will engage the strips 113 carrying the contacts 112 as the solenoid is pulled in part way, thus breaking the connections between contacts 110 and 112, also between 110*a* and 112*a*. The dogs may be so shaped that one of the breaks occurs later than the other as the risers operate. The upper contacts 111 and 111*a* may serve as stops although in some arrangements they could be used electrically.

The mirror frame 18 is fabricated with a portion cut away where the mirror 117 is fitted in between the bends 118 and 119, with the reflection taking place at the upper surface of the mirror so as to reflect light downwardly. This mirror may be fastened to the frame by cement or by metallic holding angles, not shown.

As previously indicated, the lifter solenoid and mirror frame together with all accessories may be assembled outside the chassis, and slipped into position in the chassis separate from all other assemblies.

The second assembly attached to the chassis (Fig. 2) is the shutter operating solenoid of which the frame 121 and plunger 30 may be of construction the same as in the lifter solenoid, with similar mounting angles 122 to 125 and 122*a* to 125*a* inclusively. The solenoid frame is fastened to the chassis 25 by use of angles 123, 123*a*, and by inverted L-shaped legs 126 and 126*a* which are secured to angles 124, 125, and in the rear to angles 124*a* and 125*a*. The lever 32 is of yoked shape construction to provide two separated points of support on the pin 33 of the hinge, this pin being mounted in a hinge member 34 mounted from the supporting legs 126, 126*a*. These two separate legs of the lever are spread before and behind the plunger end to which they are connected by the pin 31 suitably provided with washers and a cotter pin not shown. Above the plunger, the lever arms are given two right angle bends and are riveted together, one of the arms being projected up through the chassis 25 when the assembly is in place. To reduce frictional drag, the plunger is accurately centered, and the lever arms arranged so that the plunger rises slightly during the first half of the stroke and goes down slightly during the latter half, without binding. Also a non-ferrous rod 127 with the right end screwed into the center of the plunger and the left end fitted to move freely in a hole in the rear of the solenoid frame provides sufficient reduction of drag. As a result, the plunger is nearly free floating with the friction of the moving elements at 31, 33, 127 so low that when deenergized, the plunger is pulled out by the action of the spring built into the shutter of the lens 26 in series with the coupling spring 34.

The third assembly secured to the chassis 25 is the lens 26 mounted in a light tight sheet metal box surrounding the upper dark chamber 27. The upper stamping 128 of the box is flanged downward and has a circular hole in which is mounted the lens-shutter-iris assembly 26 by means of its standard mounting nut 129. The lower stamping 130, is flanged upward and is open for the passage of light into the lower dark chamber 28. The upper chamber is completed by the sheet metal envelope 131 taking the place of the flexible bellows of folding cameras. This enveloping sheet metal is riveted to the upper and lower stampings 128 and 130, with the plane of the lower part of the stamping 130 flush with the lower part of the bent out flanges of the chassis 25. Also the ends of the "bellows" 131 project downwardly below the lower stamping 130 a slight amount. This bellows assembly with the lens mounted thereon is mounted from the chassis 25 by pushing it up through a rectangular hole in the top part of the chassis, and securing it with screws, as shown most clearly in Fig. 4. After the shutter solenoid and lens-bellows assemblies have been secured to the chassis, they are coupled together by the spring 34 mounted to the solenoid lever by bent arm 132 and to the shutter lever by arm 133 (Fig. 4). The spring 34 may be much stiffer than that within the shutter so that the stretch of the spring during operation of the lever 32 is a small amount in comparison with the motion of the shutter lever. The coupling arms 132 and 133 are such that the shutter on "Instantaneous" will suitably be cocked and snapped when the plunger 30 is pulled in. An adjustable back stop 134 is suitably fastened to the chassis so that an adjustment may be made limiting the throw of the lever to be sufficient but not too greatly more than sufficient to permit the shutter to reset itself completely for cocking and tripping at the end of each solenoid operation. Because of the mounting of the lens system and the shutter solenoid rigidly to a common stiff chassis, the adjustments are reliably permanent.

The winding 29 of the shutter solenoid may be of different resistance than that of the lifter solenoid, but in any event the two ends of the windings are brought out by wires which together with those from the lifter solenoid and switches are connected to the controller 36.

The fourth assembly fastened to the chassis 25 is a lower cover plate 135 of sheet metal through a hole in which the protruding ends of the "bellows" 131 project. This cover plate is fastened to the lower stamping 130 of the upper dark chamber assembly by means of screws, and is also suitably fastened to the flanges of the chassis. Because the lower end of the stamping 130 was set flush with the lower surface of the chassis 25, this cover plate will be flat to permit a light tight connection between the upper chamber 27 and the lower chamber 28. Screwed to the lower cover plate are guiding slides 136 and 137 with projecting lips 138 and 139, by which a removable recording chamber may be readily connected to the camera in a light proof manner. This seal may be completed by a fixed clipping slide at the far end of the slides 136 and 137, and a movable sealing clipping slide at the front end.

Such a recording chamber may be for example fashioned from the recording end of a Polaroid (Land) Camera, as shown in Fig. 2 and in part in Fig. 3. For this purpose, an inner casing 140, 141 may be placed all around the inside of the standard casing 144 of such a camera, with the lower end seated on the bellows seat 142, 143 and with the upper end of the inner casing turned at right angles inward. The walls of the standard casing 144 may be ground down to the level of the inner casing and a flat metal top 145 secured to the inner casing with a light proof seal all around. The thickness of the flat top 145 should be slightly less than that of the slide members 136, 137, and the flat top should of course be of suitable dimension to slide into place and should have a hole in the center to admit the rays of light from the lens to the photographic recording surface. The line-up is such that the image from the screen AOB will properly focus, register and give proper dimensions to the image A'O'B' on the recording surface, such as the active surface 146 of the negative of a Polaroid film. In the drawing, all parts below surface 145 are standard parts of the Polaroid camera, by which the latent image may be developed and printed in a short time after exposure.

With reference to Fig. 3 it is seen how the camera as a whole may be mounted up from below a hole in the table surface, and a removable wooden cover box 147 with four sides placed around the upper part of the assembly. In this figure, the recording part of the camera is omitted, having been removed for reloading. With the Polaroid camera, the finished print may be removed from the recording chamber in the usual manner, and it may be noted that while one picture is being developed, another may be taken. However, we do not limit this invention to the use of this particular method of recording, and in some respects prefer a system in which the finished picture is produced on the surface upon which the latent image is first formed.

In photography, a "negative" is so called in two senses. Firstly, bright areas on the subject produce dark areas on the developed negative and vice versa. Secondly, position transfers occur such that a reversed or mirror image is obtained.

In the present case the image as seen on the active surface of the recording area is identical with the subject as normally viewed as regarding left and right because of the reversing effect of the mirror. Therefore whenever the system is used with the final picture produced by direct development of the latent image of the recording surface, there need be no change in the transmission of the picture as to rights and lefts. That is, the picture becomes a positive automatically in the positional sense. If the latent image is developed by the usual methods, black on the kinescope screen will be light on the developed picture and vice versa. This may be corrected for by a special type of development which produces white where light is impressed upon the recording surface and dark where light is not impressed. Or if the main interest is in the recording of special transmission, the matter of reversal of white and black may be taken care of by use of an added amplifier stage in the transmitter camera.

If however the picture is recorded by the negative and positive process, such as in usual photography and such as in the Polaroid (Land) camera, then position compensation for the presence of the mirror must be used to produce a proper picture. This may be accomplished in a number of ways. The camera could be designed with an added mirror between the lens and recording surface, but this is not desirable from the standpoint of compactness and sensitivity. An alternaitve would be to invert the image which is being recorded, by using a mirror at the transmitter, or omitting the mirror or reflecting prism using a "Belloptican" projector at the transmitter, or by reversing the direction of horizontal or vertical scanning. If however the picture to be recorded must be correct on the kinescope except when recording, then the position compensation may be made by reversal of the horizontal or vertical sweep in the receiver kinescope during the recording, as described in my copending application Serial No. 129,951, filed November 29, 1949. The matters of methods of utilizing the camera to produce an acceptable picture do not constitute a part of the present invention and are discussed merely to point out that the system is not rendered inoperative by the use of a mirror, but on the contrary the use of the mirror may actually simplify the recording of pictures especially prepared and transmitted.

Figure 5:
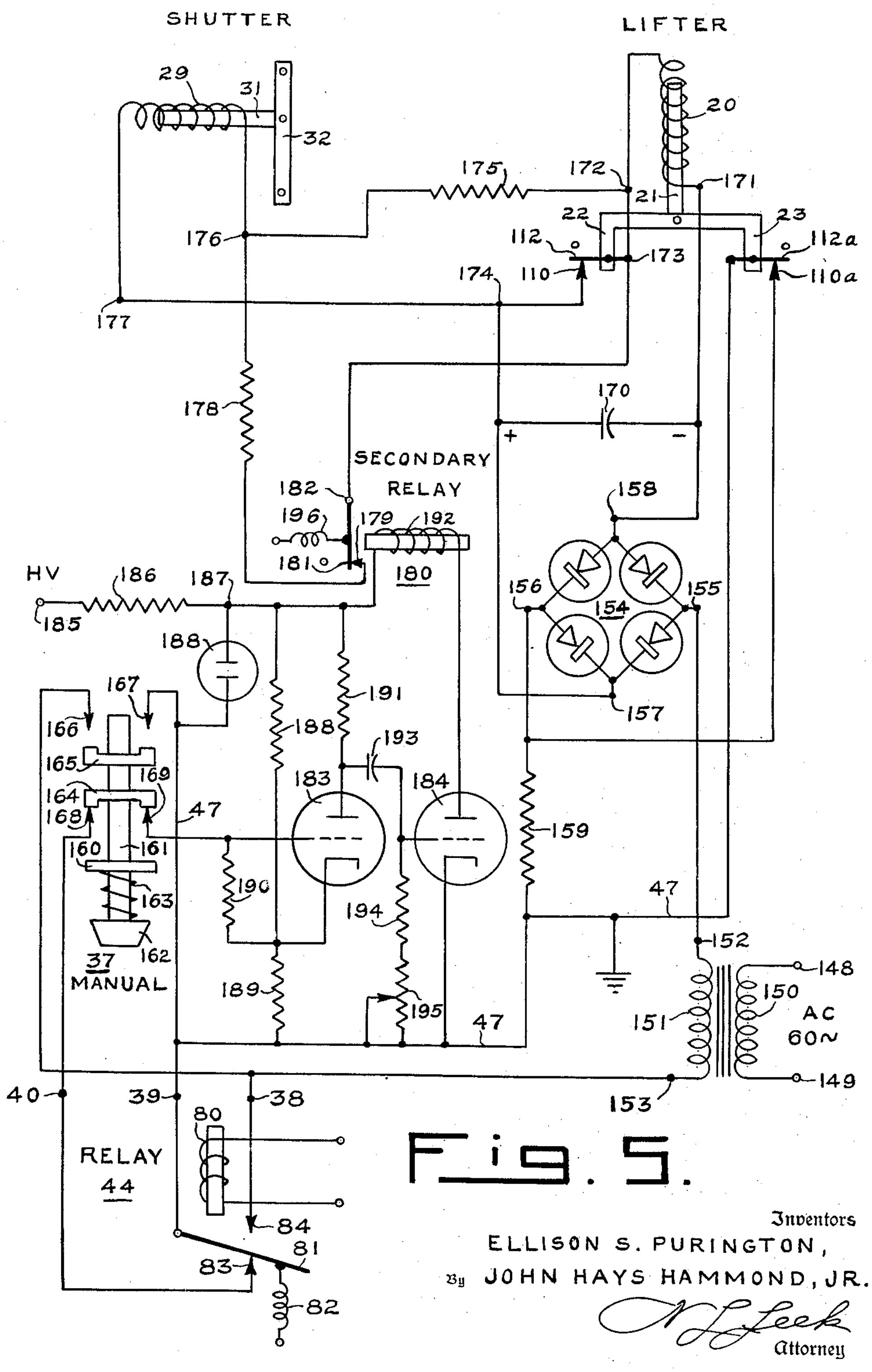
Fig. 5 is a schematic diagram showing a system for operating the camera manually from a push button located near the camera, or remotely in accordance with the operation of a distant control such as at the transmitter.

Having shown the general arrangement in Fig. 1 and the mechanical details of the camera itself in Figs. 2, 3, 4 now by reference to Fig. 5 one embodiment of the controller 36 of Fig. 1 is shown by which the camera may be controlled by push button 37 or by relay 44 similarly designated in both figures. In Fig. 5 the camera electrical parts are represented by the lifter and shutter solenoid windings 20 and 29 respectively together with the two lifter operated switches with back contacts 110, 110*a* and moving arms 112, 112*a*, the front contacts not being utilized in this arrangement. For powerizing these solenoids, an A. C.-D. C. rectifier system is provided, with the A. C. supply connected to the input terminals 148, 149, of a transformer with primary winding 150, secondary winding 151 and secondary terminals 152 and 153. A rectifier 154 of standard construction has input A. C. terminals 155, 156, the former being connected to transformer secondary terminal 152, the latter being connected to one end of a resistor 159 and also to lifter switch contact 110*a*. The other end of resistor 159 and the arm 112 are connected to ground line 47 which may be the same ground line as 47 of Fig. 1. Therefore it is seen that the rectifier is actuated by A. C. when the secondary terminal 153 is connected to ground, with full voltage applied when the lifter switch elements 110*a* and 112*a* are in contact and with a lesser voltage when the contacts are opened.

The manual push button 37 comprises a support 160 through a hole in which passes an insulated rod 161 on one end of which is the finger piece 162, with a compression spring 163 between the finger piece and the mount. On the other end of the rod 116 are mounted two metallic cross pieces 164, 165, insulated from each other and there are provided four fixed contacts 166, 167, 168 and 169. Normally the contacts 168 and 169 are electrically connected through cross piece 164, and contacts 166 and 167 are isolated. When the push button is depressed against the force of the spring 163, the contact by 164 from 168 to 169 is broken and the contact from 166 to 167 is established by cross member 165. The normal connections become reestablished by action of spring 163 when the push button is released.

Transformer secondary terminal 153 is connected to manual push button terminal 166, and also to controller terminal 38 which in turn is connected to the front contact 84 of relay 44, and the push button terminal 167, controller terminal 39 and the moving armature 81 of relay 44 are all connected to ground line 47. Therefore it is seen that when push button 37 is depressed or relay 44 is closed, the transformer secondary terminal 153 is connected to ground to complete the circuit to operate rectifier 154. Since the lifter switch elements 110*a* and 112*a* are connected for the normal horizontal position of the camera mirror, so that the A. C. line resistor 159 is shorted, full voltage will be applied to the rectifier at the start of the lifter operation and a lesser voltage toward the end of the lift after the contacts have been separated.

Negative rectifier terminal 158 is connected to the negative end of smoothing capacitor 170 and to a terminal 171 of the lifter solenoid, the other terminal 172 of which is connected to the terminal 173 of the arm of the lifter switch with moving contact 112 and fixed back contact 110, the latter being connected to junction terminal 174 and to the positive end of capacitor 170 and the positive end of the rectifier 157. Thus when at the start of the lift, the contacts 110, 112 are closed, the lifter winding 20 is directly connected to the output terminals of the rectifier. As the lift is effected and the contacts 110, 112 are separated, the voltage applied to the lifter winding 20 is reduced in accordance with the nature of the external conductive path around the contacts 110 to 112. Thus terminal 173 is connected through terminal 172 to one end of a resistor 175, the other end of which is connected to terminal 176 of the shutter solenoid winding 29, the other terminal 177 of which is connected to terminal 174. In addition, terminal 176 is connected through resistor 178 to the front contact 179 of a single pole double throw relay 180, the armature 181 of which with a terminal 182 is connected to switch terminal 173. Thus the resistor 175 is shunted by resistor 178 whenever the armature of relay 180 is closed, as in the condition indicated.

The connections are such that no current passes through the shutter solenoid winding 29 unless the contact between 110 and 112 is broken, and the rectifier powerized after closure of the relay 44 or the push button 37. Moreover the same current passes through the two solenoids after the contact 110 to 112 is broken, and this current is greater when the relay 180 is closed than when it is open.

Normally the relay 180 is closed but after the operation of the push button or relay 44, the relay will open before the lifter operates to break contacts 110 to 112 and thus make shutter current available. This current through the shutter is insufficient to operate the shutter mechanism, but serves to put a tension on the shutter and coupling springs so that it will very quickly trigger the shutter when the current in the shutter solenoid winding becomes suitably increased by restoring the relay 180 to the normal closed position. Thus provisions are made to be described below, whereby upon operation of the push button 37 or relay 44, the relay 180 will open and will remain open for a predetermined interval of time say 0.8 second, until the lifter has risen and come to rest, held in place by the current which passes through both shutter and lifter solenoid windings.

For this purpose, a "single shot multivibrator" so-called, is used utilizing two triode tubes 183 and 184. Plate power is supplied from high voltage terminal 185, connected through a resistor 186 to terminal 187 to which is connected the positive end of a voltage regulator tube 186, the other end of which is connected to ground. The terminal 187 is connected through resistor 188 to the cathode of triode 183, which in turn is connected to ground 47 through resistor 189. The grid of tube 183 is connected through a resistor 190 to the cathode of tube 183, and also to contact 169 of switch 37, the contact 168 of which is connected to controller terminal 40 and the back contact 83 of relay 44, the armature of which is connected by terminal 39 to ground. Thus in the normal condition shown, the grid of 183 is connected to ground through contacts to the push button 37 and the relay in series, with resistor 190 in parallel with resistor 189. The grid is therefore negatively biased due to the current flowing through these resistors in parallel. When either the push button is depressed breaking contacts 168 to 169, or the relay 44 is thrown to break contacts 83, 81, the grid is disconnected from ground and due to the relatively low resistance of 190 almost instantaneously comes to cathode potential.

The supply terminal 187 is also connected through plate resistor 191 to the plate of triode 183, and through the winding 192 of relay 180 to the plate of triode 184. The plate of triode 183 is connected through timing capacitor 193 to the grid of triode 184, which in turn is connected through fixed timing resistor 194, and variable timing resistor 195 to ground line 47, to which the cathode of triode 184 is also connected.

The circuit constants are such that normally with the grid of 184 at cathode potential, there is a large space current flow through winding 192. Thus for example the relay 192 may be so designed that it closes after having been previously opened when 5 milliamperes flow in the winding, and opens after having been previously closed when the current is reduced to less than 3 milliamperes, and the circuit may be so designed that normally 10 milliamperes flow in the relay winding.

The construction is further such that normally there is little or no space current in triode 183 through the resistor 191. As the grid of 183 suddenly increases from ground to cathode potential at the initial operation of push button 37 or relay 44, a current rush through resistor 191 immediately depresses the potential of the plate and because of the slugginess of capacitor 193 across the terminals of which the voltage difference cannot immediately change, there is also an immediate depression of the potential of the grid of triode 184, which quickly cuts off the space current of tube 184 so that the relay 180 opens due to the action of its armature spring 196. Thus the relay 180 is opened even before the push button or relay stroke is completed to supply A. C. voltage to the rectifier 154, and when the lifter operates to make power available for the shutter solenoid, the shutter solenoid current is the lesser of the two possible values with the mirror fully lifted, and the shutter does not operate. However, when the voltage across capacitor 193 changes and the current flow from ground through resistors 195 and 194 to the capacitor has diminished sufficiently, the tube 184 commences to conduct, finally passes current, then sufficient current say 5 ma. to close the relay 180, and at the final equilibrium condition with the grid of 184 at cathode potential the tube passes and carries the normal current say 10 milliamperes. The circuit constants, adjustable by variable resistor 195, may be so chosen that any reasonable time may exist from the initial motion of the relay 44 or push button 37 to the closure of relay 180 after the lifter has operated, as 0.5 second to 2.0 second. The timing of this delay action is more accurate and definite than the timing of the mirror elevation. Thus the mirror may come to rest in its final position say in .5 second with an allowance say of $\pm .2$ second due to mechanical inaccuracies, amount of vibration in stopping, and irregularities in the time required to fully operate the push button 37 or relay 44. On the other hand, the delay time for the shutter operation is quite precise, due to the presence of the regulator tube 186 which maintains fixed voltage for the electronic delay circuits, and due to the definiteness of the time of start of the delay action. Thus an accurate system is provided for timing the receiver to catch a picture which is transmitted during a predetermined time interval.

At the release of the pushbutton 37, or of the relay 44 so that both are in normal position, the lifter and shutter solenoids are deenergized and the mechanisms are reset, the lifter by gravity and the shutter by spring action. There is also a reset of the condition of the multi-vibrator tubes 183 and 184 with the grid of 184 going slightly positive, limited by grid current flow, and with a momentary increase of the relay circuit, but during this restoration the relay 180 continues to be closed.

Various modifications of the construction and operation of the system of camera control are possible, as will occur to those skilled in the art. For example, in Fig. 1, in place of switching contacts controlled by the operation of the lifter mechanism, it is possible to decrease the solenoid voltage by substituting a grid controlled rectifier or thyratron for the fixed bridge rectifier, and to vary the grid voltage or phase in accordance with an electronic timer, thereby simplifying the mechanism within the camera. Or in the place of the first triode of the time delay circuits of Fig. 5 it is possible to substitute a transformer with phase reversing connection. Various other modifications are possible within the scope of the following claims.

What is claimed is:

1. A system for recording a still picture from a television screen, comprising a camera having a shutter and mounted in a fixed position relative to said screen, a retractible optical system having an advanced position to direct the light rays from said screen onto said camera for recording thereby and being normally retracted to a position out of the path of said rays, means including a control circuit connected to advance said optical system to said advanced position, means including a control circuit connected to actuate said shutter, timed means to energize said control circuits in predetermined time sequence, means to actuate said timed means, means whereby said last named means is responsive to a predetermined received signal and means responsive to received signals other than said predetermined signal to prevent actuation of said timed means.

2. A system for recording a still picture from a television screen, comprising a camera having a shutter and mounted in a fixed position relative to said screen, a retractible optical system having an advanced position to direct the light rays from said screen onto said camera for recording thereby and being normally retracted to a position out of the path of said rays, means including a control circuit connected to advance said optical system to said advanced position, means including a control circuit connected to actuate said shutter, a spring connected to actuate said shutter in response to a predetermined pull, means to exert a pull less than said predetermined pull on said spring, means whereby said last named means is responsive to energization of said first circuit and means responsive to said last circuit to increase said pull to a value to actuate said shutter.

3. A system, as set forth in claim 1, in which the optical system comprises a mirror mounted to be raised to ray-intercepting position and said first control circuit includes means to raise said mirror.

4. The system, as set forth in claim 3, in which said first control circuit includes a solenoid connected to raise said mirror to its advanced position.

5. A system for recording a still picture from a television screen, comprising a camera having a shutter and mounted in a fixed position relative to said screen, a retractible optical system having an advanced position to direct the light rays from said screen onto said camera for recording thereby and being normally retracted to a position out of the path of said rays, said optical system comprising a mirror mounted to be raised to ray-intercepting position, means including a control circuit connected to advance said optical system to said advanced position, said control circuit including a solenoid to raise said mirror to its advanced position, means including a control circuit connected to actuate said shutter, timed means to energize said control circuits in predetermined time sequence, means to actuate said timed means, means whereby said last named means is responsive to a predetermined received signal, and means responsive to received signals other than said predetermined signal to prevent actuation of said timed means.

References Cited in the file of this patent

UNITED STATES PATENTS

| Number | Name | Date |
|---|---|---|
| 2,281,312 | Krist | Apr. 28, 1942 |
| 2,294,809 | Smith | Sept. 1, 1942 |
| 2,420,029 | Brady | May 6, 1947 |
| 2,429,921 | Brady | Oct. 28, 1947 |
| 2,489,017 | Dimond | Nov. 22, 1949 |
| 2,504,734 | Schmidling | Apr. 18, 1950 |